US008534299B2

(12) United States Patent
Huynh

(10) Patent No.: US 8,534,299 B2
(45) Date of Patent: Sep. 17, 2013

(54) PREFABRICATED NAILS, APPARATUS AND METHOD FOR PRODUCING

(76) Inventor: Khanh Huynh, Gilbert, AZ (US)

( * ) Notice: Subject to any disclaimer, the term of this patent is extended or adjusted under 35 U.S.C. 154(b) by 0 days.

(21) Appl. No.: 12/960,789

(22) Filed: Dec. 6, 2010

(65) Prior Publication Data

US 2011/0132386 A1    Jun. 9, 2011

Related U.S. Application Data

(60) Provisional application No. 61/267,079, filed on Dec. 6, 2009.

(51) Int. Cl.
*A45D 29/00* (2006.01)

(52) U.S. Cl.
USPC ........... 132/200; 132/73; 264/496; 264/297.2

(58) Field of Classification Search
USPC ................... 264/138, 297.2, 297.8, 337, 478, 264/496; 132/285
See application file for complete search history.

(56) References Cited

U.S. PATENT DOCUMENTS

| | | | |
|---|---|---|---|
| 4,407,310 A | 10/1983 | Jadow | |
| 4,596,260 A | 6/1986 | Giuliano | |
| 4,612,444 A | 9/1986 | Ragusa | |
| 4,669,491 A | 6/1987 | Weisberg et al. | |
| 4,682,612 A * | 7/1987 | Giuliano | 132/73 |
| 4,704,303 A * | 11/1987 | Cornell | 427/520 |
| 4,751,935 A | 6/1988 | Mast et al. | |
| 5,352,649 A * | 10/1994 | Shibahashi et al. | 503/207 |
| 5,650,138 A | 7/1997 | Resler | |
| 5,704,375 A * | 1/1998 | Wood | 132/73 |
| 5,824,180 A * | 10/1998 | Mikuni et al. | 156/275.3 |
| 5,885,514 A | 3/1999 | Tensor | |
| 6,060,073 A | 5/2000 | Keller | |
| 6,394,100 B1 * | 5/2002 | Chang | 132/200 |
| 6,481,444 B1 | 11/2002 | Lilley | |
| 6,797,261 B1 * | 9/2004 | Le | 424/61 |
| 6,803,394 B2 * | 10/2004 | Lilley et al. | 522/182 |
| 2003/0154995 A1 * | 8/2003 | Chang | 132/73 |
| 2005/0065297 A1 | 3/2005 | Patel | |
| 2005/0121048 A1 * | 6/2005 | Han | 132/73 |
| 2005/0268931 A1 * | 12/2005 | Chang | 132/200 |
| 2007/0277841 A1 * | 12/2007 | Kim | 132/73 |
| 2008/0087291 A1 * | 4/2008 | Jordan | 132/200 |
| 2008/0099037 A1 | 5/2008 | Chang | |

(Continued)

FOREIGN PATENT DOCUMENTS

DE    4446650 C2    2/2000

OTHER PUBLICATIONS

"Gel Nails: 3 Step Gels—Bonding, Building and Finishing UV Gels" www.articlesbase.com/nails-articles/gel-nails-3-step-gels-bonding-building-and-finishing-uv-gels-1237669.html.

(Continued)

*Primary Examiner* — Robyn Doan
*Assistant Examiner* — Tatiana Nobrega
(74) *Attorney, Agent, or Firm* — Benjamin D. Tietgen

(57) ABSTRACT

The present invention provides a new paradigm in prefabricated gel nails (also referred to as pre processed) gel nails, that lends itself to the mass production of the nails, in shapes, colors, styles that are close to finished, and are configured to enable the nails to be securely attached to finger nail plates applying a UV cured bonding method.

9 Claims, 10 Drawing Sheets

(56) References Cited

U.S. PATENT DOCUMENTS

| | | | |
|---|---|---|---|
| 2008/0128955 A1* | 6/2008 | Lim et al. | 264/488 |
| 2008/0159973 A1 | 7/2008 | Doan | |
| 2009/0304612 A1* | 12/2009 | Tanaka et al. | 424/61 |
| 2011/0061670 A1* | 3/2011 | Schneider et al. | 132/200 |
| 2011/0293546 A1* | 12/2011 | Tanaka et al. | 424/61 |

OTHER PUBLICATIONS

"The Answer: Gel Nail Pedicure at Home". http://www.squidoo.com/ishvarajewelry.

International Searching Authority, United States Patent and Trademark Office, International Search Report and Written Opinion, Jan. 19, 2012, Virginia.

* cited by examiner

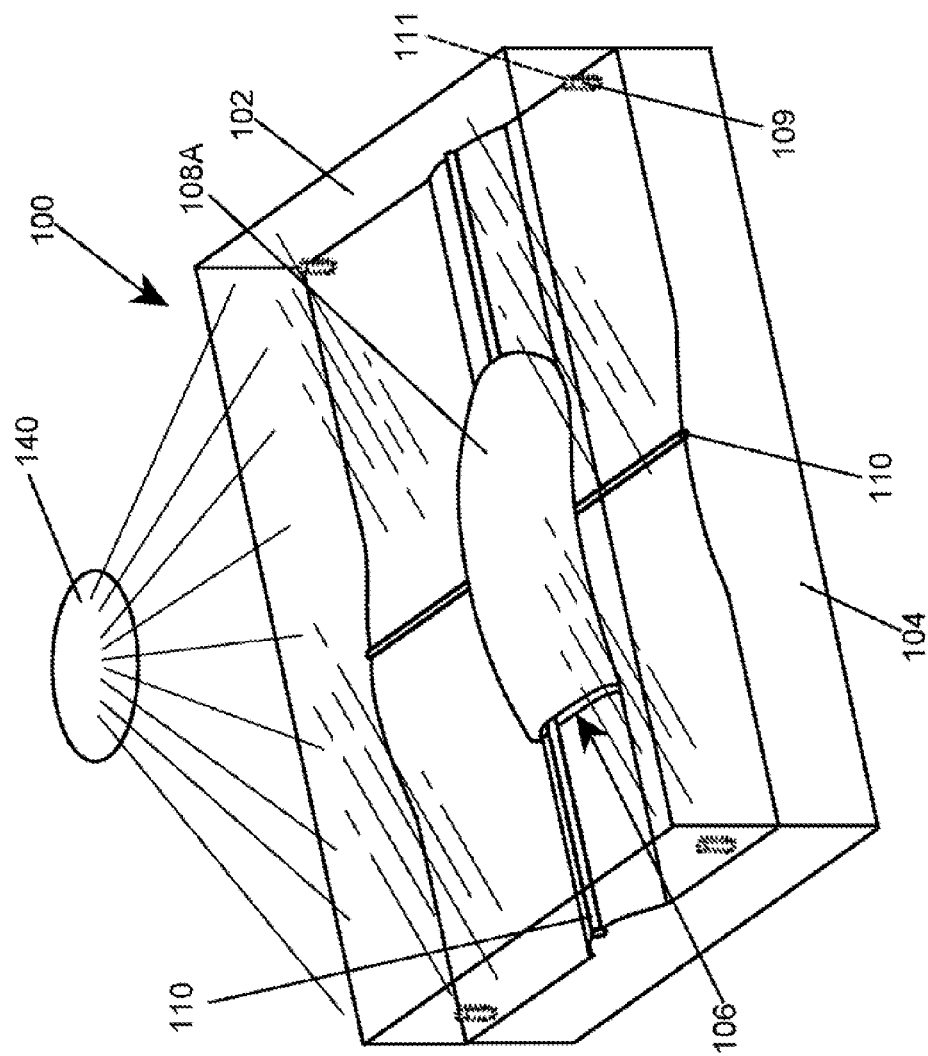

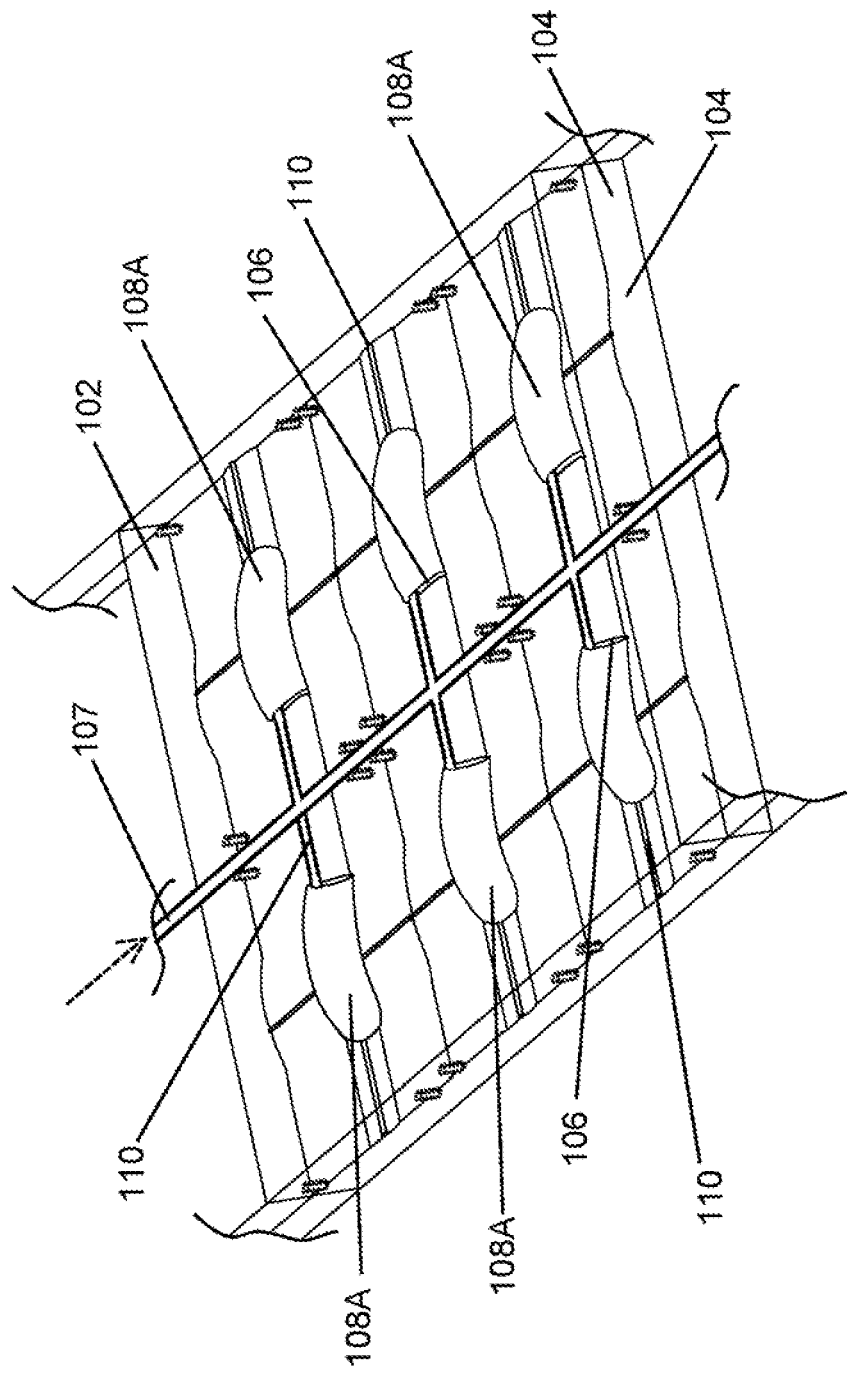

PREFABRICATED NAILS, APPARATUS AND METHOD FOR PRODUCING

RELATED APPLICATION/CLAIM OF PRIORITY

This application is related to and claims priority from U.S. provisional application Ser. No. 61/267,079, filed Dec. 6, 2009, and entitled Pre-Processed Gel Nails, which provisional application is incorporated herein by reference.

INTRODUCTION

The present invention relates to a new and useful concept in a prefabricated, artificial nail, and the manner and structure by which the prefabricated nail is made and applied.

In the applicant's experience, the application of artificial nails to fingers can be a tedious and cumbersome process, because the artificial nails are often individually produced through skillful craftsmanship rather than as prefabricated products coupled with a unique application procedure. It is common in the current traditional nail application process to roughen the finger nail plate and then skillfully overlay and sculpt a combination of liquid monomer and acrylic powder to the roughened finger nail plate. Another way, called a gel method, involves skillfully applying a gel overlay to a finger nail plate, in layers, and curing each layer as it is applied. Both methods can also be done with the attachment of a plastic tip to the ends of individual nail plates. This plastic tip gives the desired affect of extending the length of an individuals finger nails.

SUMMARY OF THE PRESENT INVENTION

The present invention provides a new paradigm in prefabricated (also referred to as pre processed) artificial nails, that lends itself to the mass production of the nails, with different patterns, colors, styles that are designed to be as close to finished as possible, and are configured to enable the prefabricated artificial nails to be securely attached to finger nail plates. The prefabricated, artificial nails can be produced in relatively large quantities, which can then be stored for subsequent application to finger nail plates. The prefabricated artificial nails are designed to have the proper density and properties needed to make each individual nail a semi permanent finished artificial nail when applied to an individual's nail plate(s). No further nail builders, fillers, or artificial nail application procedures are necessary after the bonding process More specifically, the present invention provides a new and useful concept in prefabricated, artificial nails, and the manner and structure by which the prefabricated, artificial nails are made and applied. The principles of the present invention are particularly useful in connection with a prefabricated, artificial gel nails, where a plurality of the artificial gel nails are molded, in a new and useful way, with a new and useful mold structure, and are then in a condition in which they can be easily and efficiently applied to human finger nail plates.

In accordance with the present invention, the prefabricated, artificial nails are formed by a method that comprises, a. providing a mold comprising a pair of mold members that have respective portions of a mold cavity,
  i. the mold members being assembled to a closed orientation in which they form a mold cavity and an open orientation in which they are separated in a manner that enables molded prefabricated nails to be removed from the mold cavity,
  ii. one of the mold members comprising a material that transmits ultra violet (UV) radiation, and
  iii. the mold cavity when in the closed orientation configured to define a mold with a plurality of nail cavities for a plurality of prefabricated nails and a conduit system through which UV curable material is directed into plurality of nail cavities in the mold cavity to form the prefabricated nails;
b. assembling the mold cavity to the closed orientation;
c. directing a UV curable material into the mold cavity to form a plurality of prefabricated molded nails;
d. directing UV radiation through the one mold member to cure the molded prefabricated nails in the mold cavity; and
e. opening the mold cavity and removing the cured prefabricated nails.

Preferably, the UV curable material that is injected into the mold cavity comprises a gel that is UV curable, so that the prefabricated nails, when cured in the mold cavity comprise prefabricated gel nails when they are removed from the mold cavity. The mold member that does not transmit UV radiation has a configuration that is designed to produce a predetermined roughened or coarse effect on the side of the prefabricated gel nails that are designed to contact the nail plates of the fingers to which the prefabricated gel nails are applied. That mold member preferably forms nail cavity portions each of which has a pattern of grooves that when filled with the UV curable gel produces the roughened or coarse effect on the one side of the prefabricated gel nails that, when applied, will be in contact with the finger nail plates.

The UV transmitting mold member is preferably formed of a UV transmissive material (e.g. glass, clear plastic, clear acrylic), and the other mold member is preferably formed of a stainless steel material. The pattern of grooves is preferably etched into each of the nail cavity portions formed in the stainless steel mold member. The conduit system through which the UV curable material is injected into the nail cavities produces relatively thin webs interconnecting the plurality of cured prefabricated gel nails when the plurality of cured prefabricated gel nails are removed from the mold cavity, and the thin webs are easily broken to separate the plurality of cured prefabricated gel nails from each other. The cured prefabricated gel nails can thus be produced in relatively large quantities, which can be stored for subsequent use, either before or after separation from the webs.

The method and mold structure of the present invention produces a new and useful prefabricated sculptured gel nail product, which comprises a nail body with upper and lower sides, each of which has a predetermined contour. The lower side contour has a roughened or coarse profile with a predetermined pattern of raised and recessed areas that facilitates secure adhesion of the pre fabricated nail body to a human finger nail plate. The upper side contour has a predetermined sculptured appearance, which is designed to be as close as possible to the final look of the nail.

A preformed gel nail produced by the mold and method of the present invention, is then easily and efficiently applied to a finger nail plate, by prepping and cleaning the surface of the finger nail plate, applying a UV curable bonding agent to the surface of the finger nail plate, and attaching the prefabricated gel nail to the finger nail plate under a UV cure. The lower side of the nail body, with the roughened contour, is applied directly to the finger nail plate, and its roughened contour is designed to provide secure adhesion of the nail body to the finger nail plate. The prefabricated nail can be cut and further shaped after it is attached to the finger nail plate, if that is necessary or desirable. A finishing agent of choice can be applied to the prefabricated nail while the nail is attached to the finger nail plate, to complete and enhance the finished look of the finger nail.

These and other features of the present invention will become further apparent from the following detailed description and the accompanying drawings.

BRIEF DESCRIPTION OF THE DRAWINGS

FIG. 1A is a schematic illustration of a fragmentary portion of a mold that is used in the production of prefabricated gel nails, in accordance with the principles of the present invention;

FIG. 2 is a schematic illustration of a larger fragmentary portion of the mold cavity, showing a plurality of the nail cavities and the conduit system formed in the mold portions;

DETAILED DESCRIPTION

As described above, the present invention relates to a new and useful concept in a prefabricated, artificial nail, and the manner and structure by which the prefabricated, artificial nail is made and applied. The principles of the present invention are particularly useful in connection with a prefabricated, artificial gel nail, which is formed by applicant's new and useful molding structure and method and later attached to a finger nail plate. The principles of the present invention are described herein in connection with prefabricated, artificial gel nails, and from those principles, the manner in which the principles of the present invention can be used in the production of other types of prefabricated, artificial nails will be apparent to those in the art.

Figure 1B:
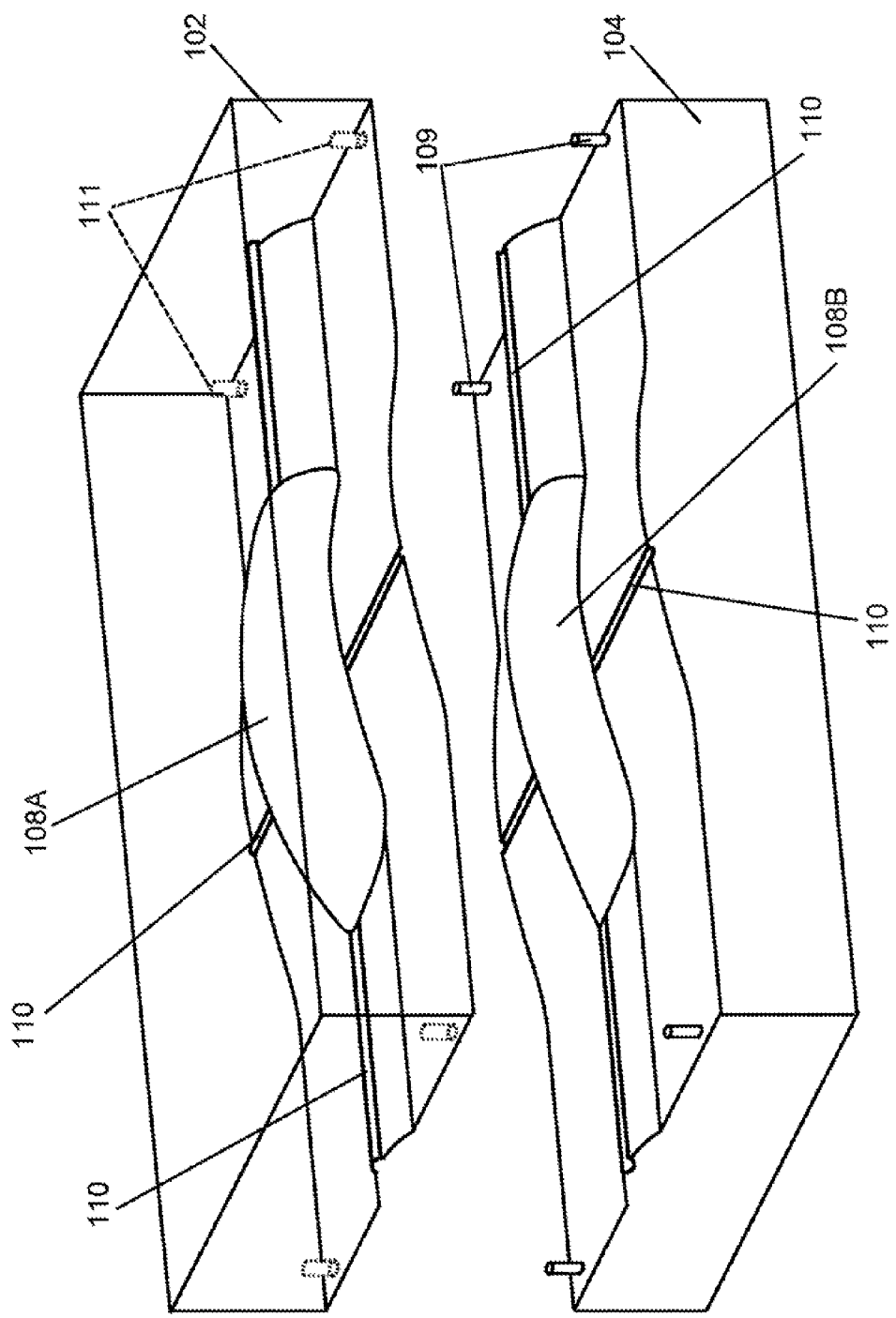
FIG. 1B is a schematic illustration of the fragmentary portion of the mold of FIG. 1A, with the mold portions in an open condition.
Figure 4:
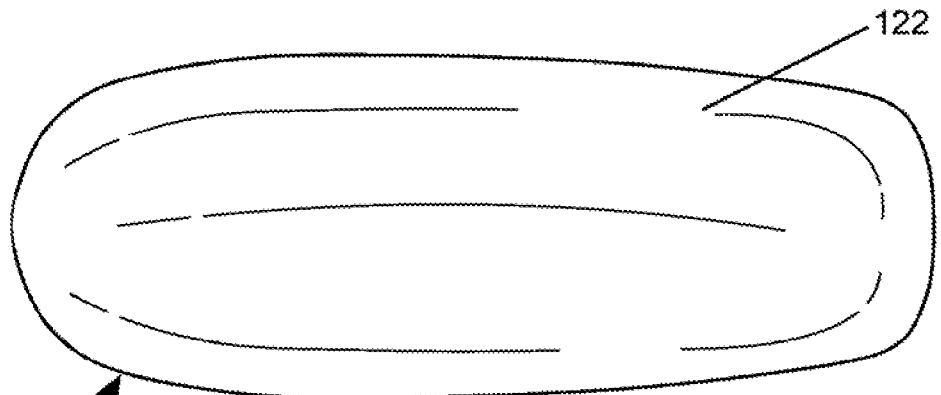
FIG. 4 is a top view of a sculptured, prefabricated, artificial nail produced by a mold and a method, according to the principles of the present invention.
Figure 5:
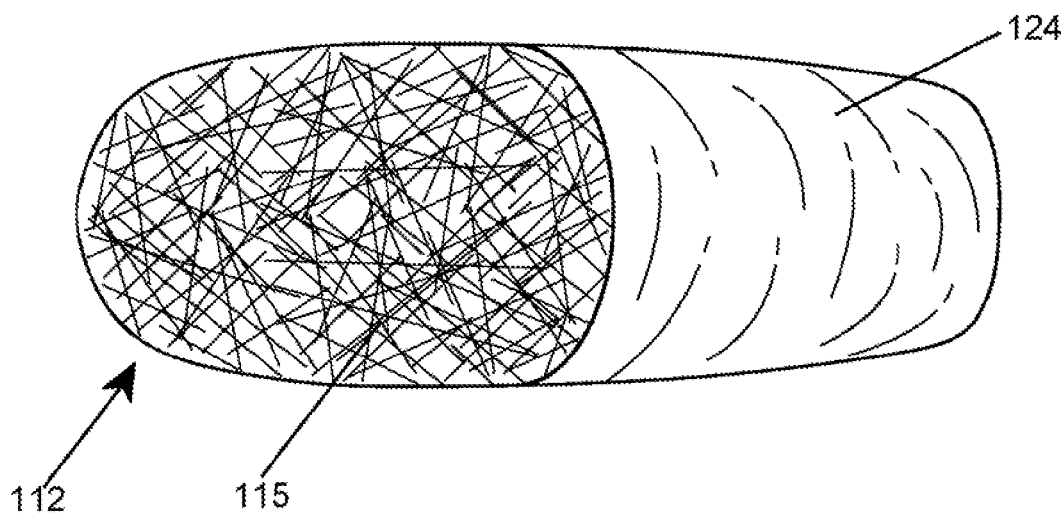
FIG. 5 is a bottom view of a sculptured, prefabricated, artificial nail produced by a mold and a method, according to the principles of the present invention.
Figure 6:
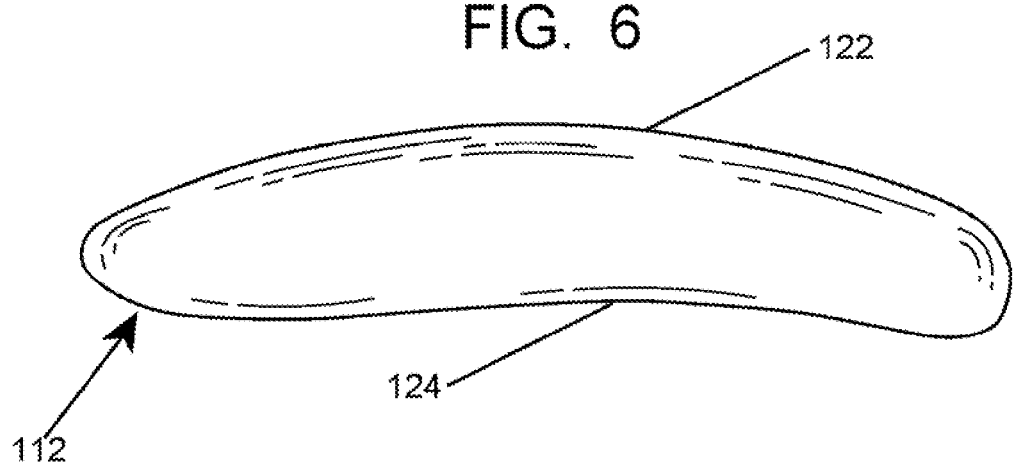
FIG. 6 is a side view of a sculptured, prefabricated, artificial nail produced by a mold and a method, according to the principles of the present invention.

The prefabricated, artificial gel nails, which have the type of structural and aesthetic characteristics of the artificial nail illustrated in FIGS. 4-6, are produced by molding the gel nails in a mold 100 (FIGS. 1A, 1B, 2). The mold 100 comprises a pair of mold members 102, 104, each of which forms a respective portion of a mold cavity 106 (FIG. 1A). The mold members 102, 104 are assembled to a closed orientation in which they form the mold 100 and an open orientation in which they are separated in a manner that enables molded prefabricated nails to be removed from the mold cavity 106. In assembling the mold members 102, 104, there are pegs 109 in one mold member that fit into recesses 111 in the other mold member to properly align the mold members.

The mold cavity 106 comprises a plurality of nail cavities 108a, 108b (FIG. 1B) and a conduit system 110 that interconnects the nail cavities. The nail cavities 108a, 108b produce the artificial nails 112 in the predetermined shape (shown e.g. in FIGS. 4-6). The conduit system 110 produces a series of relatively thin molded webs 113 (FIG. 3) between the artificial nails 112, which are easily broken to provide individual artificial nails. Each of the mold portions 102, 104 has respective portions of the nail cavities 108a, 108b and the conduit system 110 formed therein, as shown in FIGS. 1A, 1B and 2. The mold members 102, 104 are configured such that when the mold 100 is in the closed orientation the mold members 102, 104 form the mold cavity 106 (FIG. 1A) with the plurality of nail cavities 108a, 108b (FIG. 1B) and conduit system 110 (FIGS. 1A, 1B and 2), so that a plurality of prefabricated, artificial nails 112 and connecting webs 113 are produced when UV curable material is directed into mold cavity (through an injection port 107).

One of the mold members, e.g. the mold member 102, is formed of a material (e.g. glass, clear plastic, clear acrylic) that transmits ultra violet (UV) radiation. That mold member 102 has nail cavity portions configured to produce a predetermined sculptured pattern on one side of the gel nails (the side of the nail that will form the top of the artificial nail 112 that will provide the nail with an aesthetically pleasing sculptured appearance. The other mold member 104 is formed of a material (e.g. stainless steel), and has nail cavity portions configured to produce a predetermined roughened or coarse pattern on the under side of the gel nails (i.e. the sides of the nails that will be secured to the finger nail plates). FIG. 5 schematically illustrates the roughened pattern 115 on about half the bottom of the nails).

Figure 3:
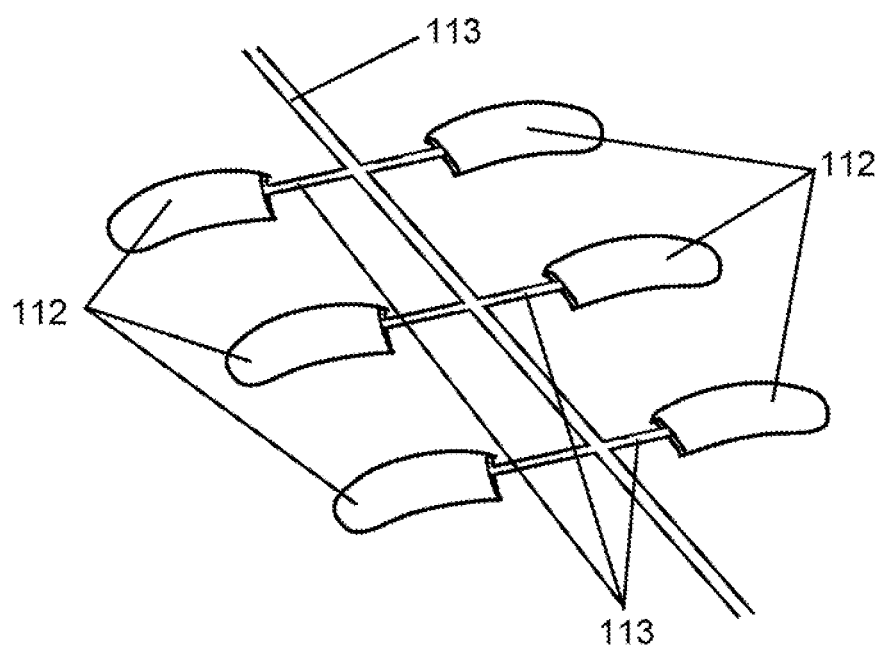
FIG. 3 is a schematic illustration of a fragmentary portion of the mold product produced from the mold, including a plurality of molded nails and webs connecting the molded nails.

In producing the prefabricated, artificial gel nails 112, the mold portions 102, 104 are assembled to place the mold 100 in the closed orientation shown in FIGS. 1A and 2. In that closed orientation, the injection port 107, which is formed partially in each of the mold portions 102, 104, enables UV curable material to be injected into the mold 100 (e.g. by an injection molding system or by manual injection). UV curable material injected into the mold 100 is directed into the nail cavities 108a, 108b by the conduit system 110, so that the UV curable material is shaped into the artificial nails by the nail cavities. When the UV curable material has been injected into the mold, so that it fills the nail cavities and is shaped by the nail cavities into the prefabricated gel nails, UV radiation is directed through the UV transmissive mold member 102, to cure the mold material. That results in a plurality of cured prefabricated gel nails 112, each having the predetermined configuration of the nail cavities, and a series of relatively thin webs 113 interconnecting the cured prefabricated gel nails (FIG. 3). The mold 100 is then opened, by separating the mold members 102, 104 and the cured, molded product, comprising the molded gel nails 112, with the connecting webs 113, is then removed from the mold 100 (see FIG. 3).

The UV curable gel material that is injected into the mold to produce the molded product preferably has the following composition: the materials used include any or all of Urethane Diacrylate, Urethane Triacyrlate, Urethane Tripropyleneglycol diacrylate, Urethane Acrylate Oligomer, Methacrylate Ester Monomers, Pigments and Photoinitiator.

When the molded product is removed from the mold, and the webs 110 broken, a plurality of the prefabricated gel nails 112 are produced, each gel nail has the configuration shown in FIGS. 4-6. Specifically, each prefabricated gel nail 112 has a nail body 120 with upper and lower sides 122, 124, respectively. The upper side 122 has a predetermined sculptured contour that is as close to the finished contour of the nail as possible, and the sculptured contour is designed to be as visually attractive (aesthetically pleasing) as possible. The lower side 124 of the nail is designed to be secured to the nail plate of a finger to which the nail is attached. The lower side 124 has a predetermined portion with a roughened pattern designed to facilitate adhesion of the prefabricated nail to a finger nail plate. Preferably, the roughened pattern 115 comprises raised areas and recesses to provide a roughened or coarse side that facilitates adhesion of the nail body to the nail plate. As shown in FIG. 5, the roughened pattern 115 may comprise e.g. about half the nail bottom, since that is about the amount of the nail that would be secured to a finger nail plate.

In order to produce that configuration in the prefabricated gel nails, the mold member 102 (e.g. the mold member made of UV transmissive material, e.g. glass, clear plastic, clear acrylic) has nail cavity portions 8a (FIG. 1B) with relatively smooth, contoured profiles, so that when the gel is injected through the injection port 107 and is directed through the conduit system 110 and into the nail cavities, the upper surfaces of the nails take on the smooth sculptured look of the nail cavity portions of the mold portion 102. The gel material, after being injected into the mold, is then be cured while the mold is still closed, by exposure to UV light 140 (FIG. 1A) that is directed through the mold member 102 that is transmissive to UV radiation. Then, the mold 100 is opened and the molded nails 112 with the connecting webs 113 can be removed from the mold.

Thus, the mold member 102 produces a predetermined sculptured pattern on the upper sides 122 of the prefabricated gel nails. The stainless steel mold member 104 produces the roughened profile to the bottoms of the prefabricated gel nails. The stainless steel mold member 104 can have a pattern of grooves that are etched in the surface of its nail cavities (e.g. in pattern shown in FIG. 5) and produces a predetermined roughened or coarse pattern 115 on the other (or lower) sides 124 of the prefabricated gel nails.

The conduit system 110 through which the UV curable material is directed into the nail cavity portions produces the relatively thin webs 113 interconnecting the plurality of cured prefabricated gel nails when the plurality of cured prefabricated gel nails are removed from the mold cavity. Those thin webs 113 are easily broken to separate the plurality of cured prefabricated gel nails from each other.

As will be apparent from the foregoing description, the prefabricated gel nails 112, either with webs 113 intact, or with webs 113, broken, can be produced in relatively large quantities, which can then be stored for subsequent application to finger nail plates. The prefabricated nails 112 can be produced in various shapes (e.g. by changing the nail cavity contours of the mold members), and in various colors with varying designs and patterns by adding appropriate coloring agents and or different materials either before or after the gel is injected into the mold. The prefabricated artificial nails can thus be mass produced, and then stored for subsequent application to finger nail plates. The artificial nails, are designed to have the proper density and properties needed to make each individual nail a semi permanent finished artificial nail when applied to an individual's nail plate(s)

Figure 7:
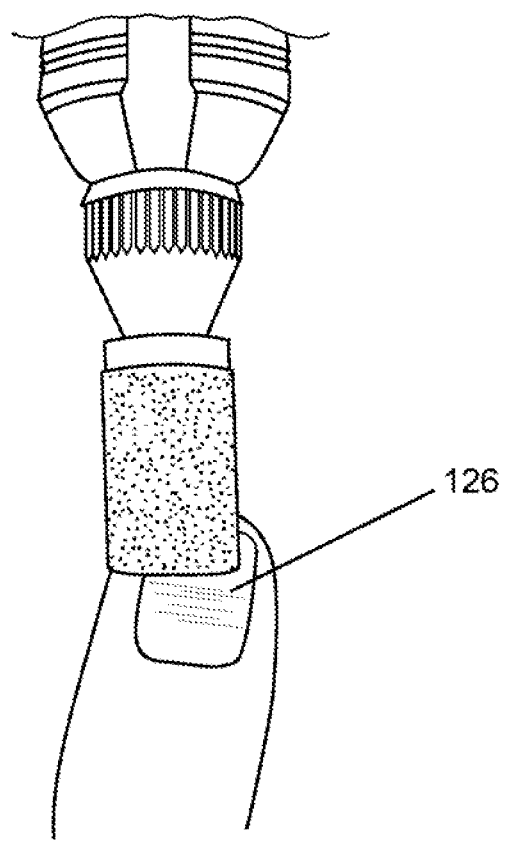
FIGS. 7 and 8 are schematic illustrations of prepping a finger nail plate, for application of a sculptured, prefabricated, artificial nail produced by a mold and a method, according to the principles of the present invention.
Figure 8:
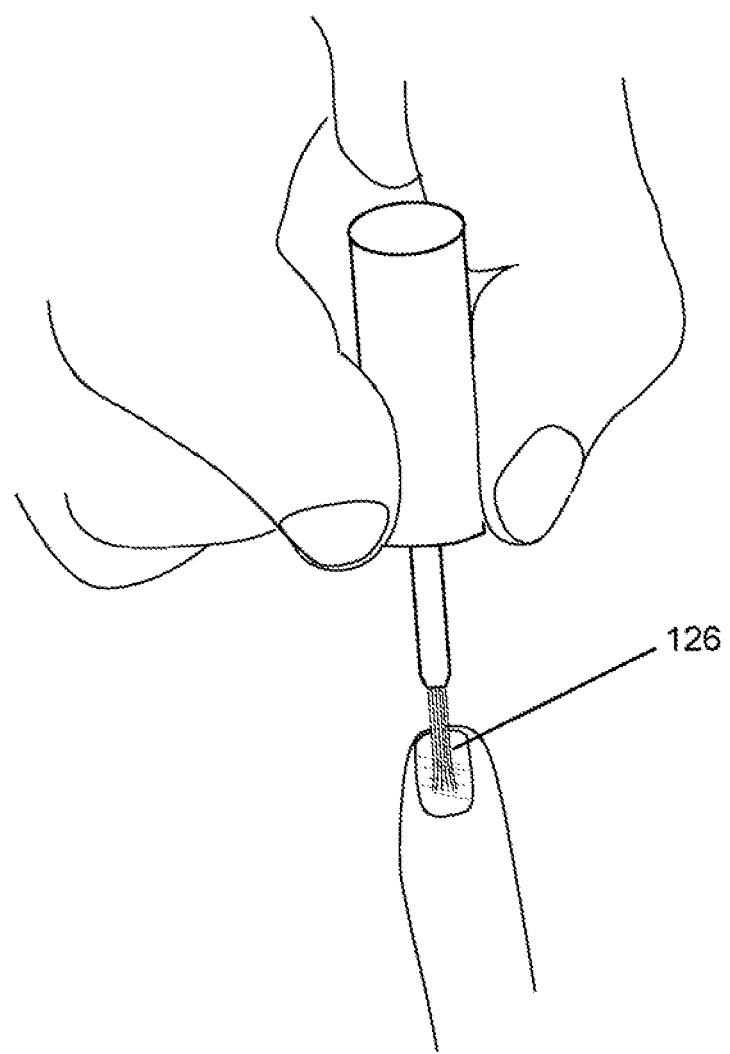
Figure 9:
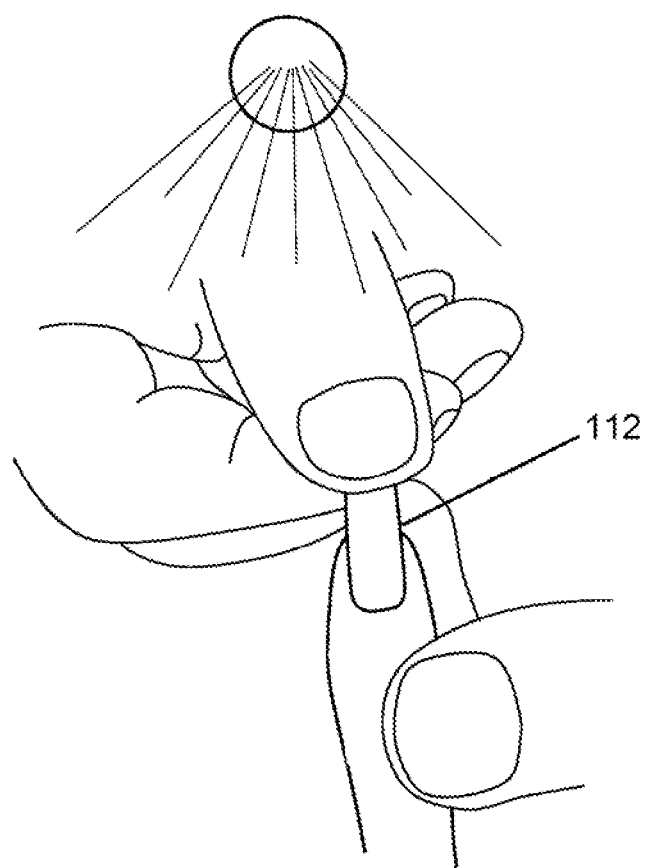
FIG. 9 is a schematic illustrations of application of a sculptured, prefabricated, artificial nail, to a finger nail plate, according to the principles of the present invention.
Figure 10C:
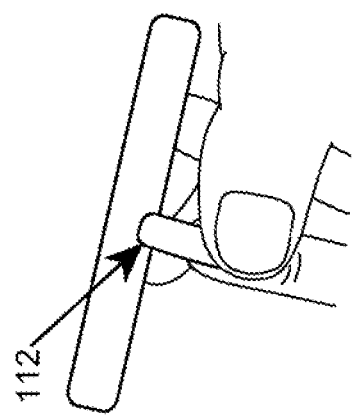
FIGS. 10A, 10B and 10C are schematic illustrations of processing steps after an artificial nail has been applied to a finger nail plate.
Figure 10B:
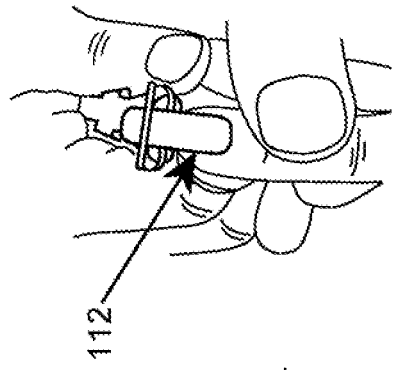
Figure 10A:
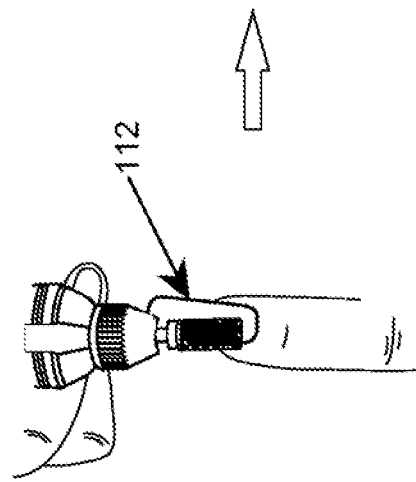
Figure 11:
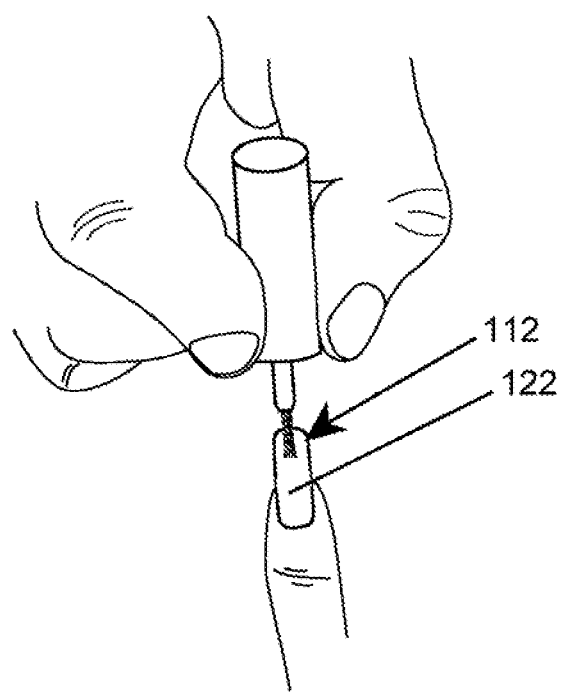
FIG. 11 is a schematic illustration of a finishing step that can be performed on a sculptured, prefabricated, artificial nail, that has been applied to a finger nail plate, according to the principles of the present invention.

A prefabricated gel nail can then be applied to a finger nail plate 126, in the manner schematically illustrated in FIGS. 7-9, 10A, 10B, 10B and 11. As shown by FIGS. 7 and 8, the surface of the finger nail plate 126 is prepped and cleaned, e.g. by providing some roughening and by brushing the nail plate to clean it. Then, as illustrated in FIG. 9, a UV curable bonding agent is applied to the surface of the finger nail plate 126, and the prefabricated gel nail 112 attached to the finger nail plate under a UV cure. Then, as illustrated by FIGS. 10A, 10B and 10C, with the prefabricated gel nail attached to the finger nail plate, the prefabricated gel nail 112 can be further shaped while the gel nail is attached to the finger nail plate, e.g. by grinding (FIG. 10A, cutting (FIG. 10B and/or filing (FIG. 10C) the artificial nail. Then, a finishing agent (FIG. 11) can be applied to the sculptured top 122 of the prefabricated gel nail, to finish the application process.

Thus, the foregoing description provides prefabricated artificial gel nails that can be mass produced, in relatively large quantities, and yet when produced will have as close to a finished shape as possible when produced. The artificial gel nails are full well artificial gel nails, formed through the molding process described herein. The mold process can be achieved through machine injection or manual injection using ingredients comprised of but are not exclusive to and in no particular order, Urethane Diacrylate, Urethane Triacyrlate, Tripropyleneglycol diacrylate, Urethane Acrylate Oligomer, Methacrylate Ester Monomers, Pigments and Photoinitiator, also known as UV Gel. The ingredients, after being injected into the mold, will then be cured by exposure to UV light 140 (FIG. 1A) that is directed through the mold member 102 that is transmissive to UV radiation.

As will be appreciated from the foregoing description, the prefabricated gel nails can be manufactured in a variety of sizes, with various shades, colors, and patterns, which are determined by ingredients, color pigments, and particles, added during processing and manufacturing. The prefabricated gel nails can then be applied and bonded onto nail plates at a later time, in the manner described herein. The gel nails, will have the proper density and properties needed to make each individual gel nail a semi permanent finished artificial gel nail when applied to an individual or individual's nail plate(s) according to the requirements and parameters of current artificial nails application procedures and or methods. No further nail builders, fillers, or artificial nail application procedures are necessary after the bonding process As will be further appreciated from the foregoing description, the bonding procedure entails:

a. Prepping the surface of individual's nail plates by gently and lightly filing the surface with a nail drill. This will roughen top few layers of the nail plate in order to create optimum adhesion, and bonding to the Pre Fabricated Gel Nail once bonding agent is applied.

b. Clean off surface of nail plate (e.g. with a brush or a burst of air) to insure that no contaminants or debris are on the working surface of the nail plate. This too is to insure for optimum adhesion and bonding.

c. Apply bonding agent to surface of the nail plates. The Bonding agent will be a UV photo initiated gel resin, preferably comprising Urethane Diacrylate, Urethane Triacyrlate, Tripropyleneglycol diacrylate, Urethane Acrylate Oligomer, Methacrylate Ester Monomers, Pigments and Photoinitiator d. Under direct exposure of a UV light, attach Pre Fabricated Gel Nail to the nail plate according to size and fit of each individual nail plate, applying pressure, press down and hold in place firmly for about 30-60 seconds. Repeat this step for all 10 fingers. Afterwards, letting the whole hand rest under the UV light for an additional minute to further cure and bond.

e. Then cut to desired length and shape as needed.

f. With a nail file (Nail drill), go over and remove any excess product around edges of cuticles or surface areas of applied PreFabricated Gel nails that might have occurred during the bonding process.

g. Apply a finishing agent such as polish or a gel resin topcoat according to desired effect (The final nail can have added glitter during production).

In addition, the molds for the Gel Nails comprise the solid portion (preferably metal) and a clear composite (glass, clear plastic, or clear acrylic) so that UV light can pass through to cure the composite (gel) being injected into the mold cavity.

Finally, it is contemplated that a molded gel nail, according to the principles of the present invention, can have a sculptured French tip design, which would comprise various colors or pigmentation on a portion (e.g. about half to three fifths) the nail that forms the French tip. The sculptured French tip would be e.g. a chevron or curved French tip design. In order to produce that sculptured French tip design, the top mold piece would be configured such that the top surface produced from that mold piece has a French tip area in the form of an indention on a portion (e.g. half, three fifths) of the top surface. That filled in area of the mold would enable a different colored gel and or particles to be molded into the sculptured nail, to produce the molded gel nail as a sculptured French tip design. Exhibit A is a copy of FIG. 1B that has been marked to show the manner in which such a mold can be configured.

With the foregoing description in mind, the various ways in which a prefabricated artificial nail, particularly an artificial gel nail, can be configured, produced and used, in accordance with the principles of the present invention will be clear to those in the art.

What is claimed is:

1. A method of applying prefabricated gel nails to the finger nails of a human hand, the method comprising:
   providing a mold comprising a pair of mold members that have respective portions of a mold cavity,
      the mold members being assembled to a closed orientation in which they form a mold cavity and an open orientation in which they are separated in a manner that enables a plurality of the prefabricated gel nails to be removed from the mold cavity,
      a first of the mold members comprising a material that transmits UV radiation,
      the mold cavity configured to define a mold with a plurality of nail cavities for producing the prefabricated gel nails and a conduit system through which UV curable material injected into the mold cavity is directed into the nail cavities to form the prefabricated gel nails;
   assembling the mold cavity to the closed orientation;
   injecting a UV curable material into the mold cavity to form the prefabricated gel nails, the UV curable material comprising a gel;
   curing the prefabricated gel nails in the mold cavity by directing UV radiation through the first mold member;
   opening the mold members and removing the prefabricated gel nails; and
   applying the prefabricated gel nails to the finger nails by
      prepping the surfaces of the finger nail plates,
      cleaning the surfaces of the finger nail plates,
      applying a UV curable bonding agent to the surfaces of the finger nail plates,
      positioning the prefabricated gel nails on the finger nail plates over the bonding agent, and
      applying UV radiation through the prefabricated gel nails onto the bonding agent to attach the prefabricated gel nails to the finger nail plates by UV cure.

2. The method of claim 1, further including shaping the prefabricated gel nails while the prefabricated gel nails are attached to the finger nail plates.

3. The method of claim 2, further including applying a finishing agent to the prefabricated gel nails while attached to the finger nail plates.

4. The method of claim 1, wherein the first mold member has a configuration that is designed to produce a predetermined sculptured pattern on one side of the prefabricated gel nails and a second of the mold members has a configuration that is designed to produce a predetermined roughened pattern on the other side of the prefabricated gel nails.

5. The method of claim 4, wherein the nail cavity portions on the second mold member each has a pattern of grooves that when filled with the UV curable gel and cured produce the roughened or coarse pattern on the other side of the prefabricated gel nails.

6. The method of claim 5, wherein the first mold member is formed of a UV transmissive material and the second mold member is formed of a stainless steel material.

7. The method of claim 6, wherein the plurality of cured prefabricated gel nails are interconnected by relatively thin webs when the plurality of cured prefabricated gel nails are removed from the mold cavity, and further including separating the plurality of cured prefabricated gel nails from each other.

8. A method of applying preformed artificial nails to the finger nails of a human hand, comprising:
   a. applying a UV curable bonding agent to the surface of each finger nail plate;
   b. positioning a prefabricated gel nail on each finger nail plate over the bonding agent, the prefabricated gel nail comprising a UV curable and UV transmissible gel; and
   c. applying UV radiation through each prefabricated gel nail onto the bonding agent to attach the prefabricated gel nail to the finger nail plate by UV cure.

9. The method of claim 8 wherein the prefabricated gel nails are formed by a method comprising:
   a. providing a mold comprising first and second mold members that have respective portions of a mold cavity, wherein:
      i. the first and second mold members may be assembled to a closed orientation in which they form a mold cavity and an open orientation in which they are separated in a manner that enables the prefabricated gel nails to be removed from the mold cavity,
      ii. the first mold member comprises a material that transmits UV radiation, and
      iii. the mold cavity is configured to define a mold with a plurality of nail cavities for a plurality of prefabricated nails and a conduit system through which the gel is directed into the nail cavities to form the prefabricated gel nails;
   b. assembling the first and second mold members to the closed orientation;
   c. injecting the gel into the nail cavities;
   d. directing UV radiation through the first mold member to cure the gel in the mold cavity; and
   e. assembling the first and second mold members to the open orientation to remove the cured prefabricated gel nails.

* * * * *